US007190749B2

(12) United States Patent
Levin et al.

(10) Patent No.: US 7,190,749 B2
(45) Date of Patent: Mar. 13, 2007

(54) METHOD AND APPARATUS FOR CANCELING PILOT INTERFERENCE IN A WIRELESS COMMUNICATION SYSTEM

(75) Inventors: Jeffrey A. Levin, San Diego, CA (US); Thomas B. Wilborn, San Diego, CA (US); Brian K. Butler, La Jolla, CA (US); Paul E. Bender, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 777 days.

(21) Appl. No.: 09/974,935

(22) Filed: Oct. 10, 2001

(65) Prior Publication Data

US 2003/0021334 A1    Jan. 30, 2003

Related U.S. Application Data

(60) Provisional application No. 60/296,259, filed on Jun. 6, 2001.

(51) Int. Cl.
*H03D 1/04* (2006.01)
*H04B 1/707* (2006.01)

(52) U.S. Cl. ..................................... 375/346
(58) Field of Classification Search ................ 375/346, 375/349, 350
See application file for complete search history.

(56) References Cited

U.S. PATENT DOCUMENTS

| 5,812,600 | A | 9/1998 | Hess et al. |
| 6,034,986 | A | 3/2000 | Yellin |
| 6,067,292 | A | 5/2000 | Huang et al. |
| 6,680,727 | B2 * | 1/2004 | Butler et al. ................. 375/144 |
| 6,865,218 | B1 * | 3/2005 | Sourour ....................... 375/148 |
| 6,917,642 | B1 * | 7/2005 | Rouphael et al. ........... 375/140 |

FOREIGN PATENT DOCUMENTS

EP    0980149    2/2000

OTHER PUBLICATIONS

Iwakiri, N., Iwakiri, N., *Interference Reduction Efficiency of a Turbo Coded CDMA Multilayer System Equipped with a Pilot Canceler:* vol. 1, p. 391-395 (1999).

* cited by examiner

*Primary Examiner*—Kevin Kim
(74) *Attorney, Agent, or Firm*—Thomas R. Rouse; Thien T. Nguyen; George C. Pappas

(57) ABSTRACT

Techniques for canceling pilot interference in a wireless (e.g., CDMA) communication system. In one method, a received signal comprised of a number of signal instances, each including a pilot, is initially processed to provide data samples. Each signal instance's pilot interference may be estimated by despreading the data samples with a spreading sequence for the signal instance, channelizing the despread data to provide pilot symbols, filtering the pilot symbols to estimate the channel response of the signal instance, and multiplying the estimated channel response with the spreading sequence to provide the estimated pilot interference. The pilot interference estimates due to all interfering multipaths are combined to derive the total pilot interference, which is subtracted from the data samples to provide pilot-canceled data samples. These samples are then processed to derive demodulated data for each of at least one (desired) signal instance in the received signal.

41 Claims, 9 Drawing Sheets

METHOD AND APPARATUS FOR CANCELING PILOT INTERFERENCE IN A WIRELESS COMMUNICATION SYSTEM

This application claims the benefit of provisional U.S. application Ser. No. 60/296,259, entitled "METHOD AND APPARATUS FOR CANCELLATION OF MULTIPLE PILOT SIGNALS," filed Jun. 6, 2001, which is incorporated herein by reference in its entirety for all purposes.

BACKGROUND

1. Field

The present invention relates generally to data communication, and more specifically to techniques for canceling interference due to pilots in a wireless (e.g., CDMA) communication system.

2. Background

Wireless communication systems are widely deployed to provide various types of communication such as voice, packet data, and so on. These systems may be based on code division multiple access (CDMA), time division multiple access (TDMA), or some other multiple access technique. CDMA systems may provide certain advantages over other types of systems, including increased system capacity. A CDMA system is typically designed to implement one or more standards, such as IS-95, cdma2000, IS-856, W-CDMA, and TS-CDMA standards, all of which are known in the art.

In some wireless (e.g., CDMA) communication systems, a pilot may be transmitted from a transmitter unit (e.g., a terminal) to a receiver unit (e.g., a base station) to assist the receiver unit to perform a number of functions. For example, the pilot may be used at the receiver unit for synchronization with the timing and frequency of the transmitter unit, estimation of the channel response and the quality of the communication channel, coherent demodulation of data transmission, and so on. The pilot is typically generated based on a known data pattern (e.g., a sequence of all zeros) and using a known signal processing scheme (e.g., channelized with a particular channelization code and spread with a known spreading sequence).

On the reverse link in a cdma2000 system, the spreading sequence for each terminal is generated based on (1) a complex pseudo-random noise (PN) sequence common to all terminals and (2) a scrambling sequence specific to the terminal. In this way, the pilots from different terminals may be identified by their different spreading sequences. On the forward link in cdma2000 and IS-95 systems, each base station is assigned a specific offset of the PN sequence. In this way, the pilots from different base stations may be identified by their different assigned PN offsets.

At the receiver unit, a rake receiver is often used to recover the transmitted pilot, signaling, and traffic data from all transmitter units that have established communication with the receiver unit. A signal transmitted from a particular transmitter unit may be received at the receiver unit via multiple signal paths, and each received signal instance (or multipath) of sufficient strength may be individually demodulated by the rake receiver. Each such multipath is processed in a manner complementary to that performed at the transmitter unit to recover the data and pilot received via this multipath. The recovered pilot has an amplitude and phase determined by, and indicative of, the channel response for the multipath. The pilot is typically used for coherent demodulation of various types of data transmitted along with the pilot, which are similarly distorted by the channel response. For each transmitter unit, the pilots for a number of multipaths of the transmitter unit are also used to combine demodulated symbols derived from these multipaths to obtain combined symbols having improved quality.

On the reverse link, the pilot from each transmitting terminal acts as interference to the signals from all other terminals. For each terminal, the aggregate interference due to the pilots transmitted by all other terminals may be a large percentage of the total interference experienced by this terminal. This pilot interference can degrade performance (e.g., a higher packet error rate) and further reduce the reverse link capacity.

Therefore, there is a need for techniques to cancel interference due to pilots in a wireless (e.g., CDMA) communication system.

SUMMARY

Aspects of the present invention provide techniques for estimating and canceling pilot interference in a wireless (e.g., CDMA) communication system. A received signal typically includes a number of signal instances (i.e., multipaths). For each multipath to be demodulated (i.e., each desired multipath), the pilots in all multipaths are interference to the data in the desired multipath. If the pilot is generated based on a known data pattern (e.g., a sequence of all zeros) and channelized with a known channelization code (e.g., a Walsh code of zero), then the pilot in an interfering multipath may be estimated as simply a spreading sequence with a phase corresponding to the arrival time of that multipath at the receiver unit. The pilot interference from each interfering multipath may be estimated based on the spreading sequence and an estimate of the channel response of that multipath (which may be estimated based on the pilot). The total pilot interference due to a number of interfering multipaths may be derived and subtracted from the received signal to provide a pilot-canceled signal having the pilot interference removed.

In one specific embodiment, a method for canceling pilot interference at a receiver unit (e.g., a base station) in a wireless (e.g., cdma2000) communication system is provided. In accordance with the method, a received signal comprised of a number of signal instances, each of which includes a pilot, is initially processed to provide data samples. The data samples are then processed to derive an estimate of the pilot interference due to each of one or more (interfering) signal instances, and the pilot interference estimates are further combined to derive the total pilot interference. The total pilot interference is then subtracted from the data samples to provide pilot-canceled data samples, which are further processed to derive demodulated data for each of at least one (desired) signal instance in the received signal.

The pilot interference due to each interfering signal instance may be estimated by (1) despreading the data samples with a spreading sequence for the signal instance, (2) channelizing the despread samples with a pilot channelization code to provide pilot symbols, (3) filtering the pilot symbols to provide an estimated channel response of the signal instance, and (4) multiplying the spreading sequence for the signal instance with the estimated channel response to provide the estimated pilot interference. The data demodulation for each desired multipath may be performed by (1) despreading the pilot-canceled data samples with the spreading sequence for the signal instance, (2) channelizing the despread samples with a data channelization code to provide data symbols, and (3) demodulating the data symbols to provide the demodulated data for the signal instance. For improved performance, the pilot estimation and cancellation may be performed at a sample rate that is higher than the PN chip rate.

Various aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
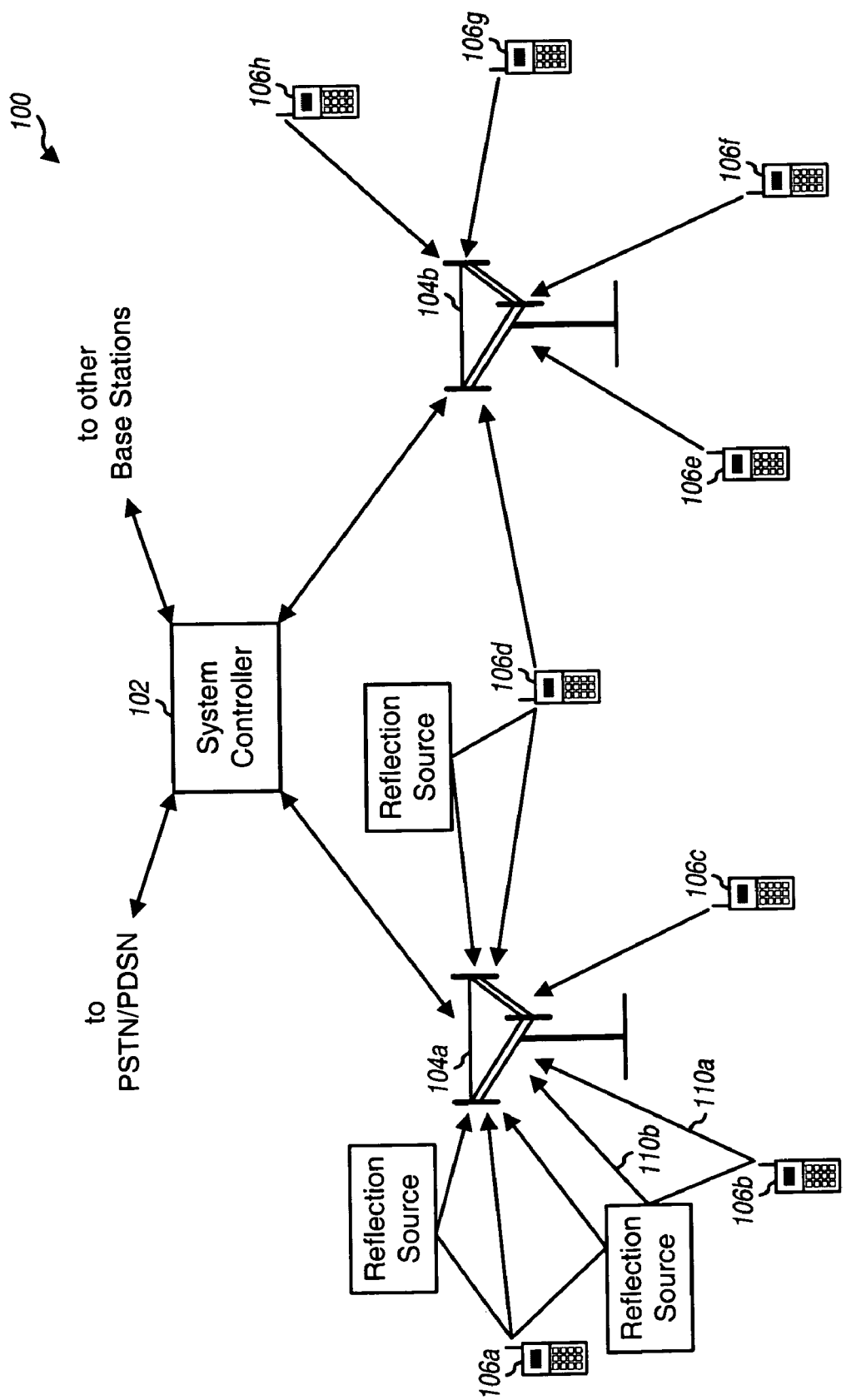
FIG. 1 is a diagram of a wireless communication system.

FIG. 1 is a diagram of a wireless communication system 100 that supports a number of users and wherein various aspects and embodiments of the invention may be implemented. System 100 provides communication for a number of cells, with each cell being serviced by a corresponding base station 104. A base station is also commonly referred to as a base-station transceiver system (BTS), an access point, or a Node B. Various terminals 106 are dispersed throughout the system. Each terminal 106 may communicate with one or more base stations 104 on the forward and reverse links at any given moment, depending on whether or not the terminal is active and whether or not it is in soft handoff. The forward link (i.e., downlink) refers to transmission from the base station to the terminal, and the reverse link (i.e., uplink) refers to transmission from the terminal to the base station.

A signal transmitted from a terminal may reach a base station via one or multiple signal paths. These signal paths may include a straight path (e.g., signal path 110a) and reflected paths (e.g., signal path 110b). A reflected path is created when the transmitted signal is reflected off a reflection source and arrives at the base station via a different path than the line-of-sight path. The reflection sources are typically artifacts in the environment in which the terminal is operating (e.g., buildings, trees, or some other structures). The signal received by each antenna at the base station may thus comprise a number of signal instances (or multipaths) from one or more terminals.

In system 100, a system controller 102 (which is also often referred to as a base station controller (BSC)) couples to base stations 104, provides coordination and control for the base stations coupled to it, and further controls the routing of calls to terminals 106 via the coupled base stations. System controller 102 may further couple to a public switched telephone network (PSTN) via a mobile switching center (MSC), and to a packet data network via a packet data serving node (PDSN), which are not shown in FIG. 1. System 100 may be designed to support one or more CDMA standards such as cdma2000, IS-95, IS-856, W-CDMA, TS-CDMA, some other CDMA standards, or a combination thereof. These CDMA standards are known in the art and incorporated herein by reference.

Various aspects and embodiments of the invention may be applied for the forward and reverse links in various wireless communication systems. For clarity, the pilot interference cancellation techniques are specifically described for the reverse link in a cdma2000 system.

Figure 2:
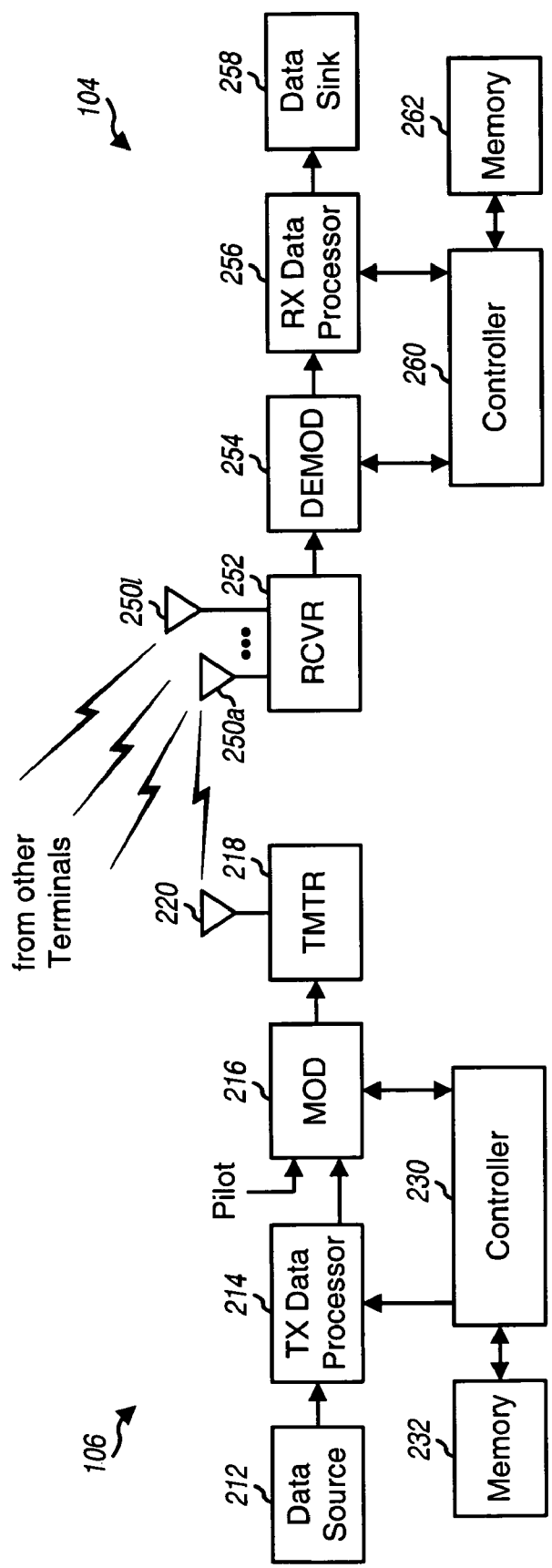
FIG. 2 is a simplified block diagram of an embodiment of a base station and a terminal.

FIG. 2 is a simplified block diagram of an embodiment of base station 104 and terminal 106. On the reverse link, at terminal 106, a transmit (TX) data processor 214 receives various types of "traffic" such as user-specific data from a data source 212, messages, and so on. TX data processor 214 then formats and codes the different types of traffic based on one or more coding schemes to provide coded data. Each coding scheme may include any combination of cyclic redundancy check (CRC), convolutional, Turbo, block, and other coding, or no coding at all. Interleaving is commonly applied when error correcting codes are used to combat fading. Other coding schemes may include automatic repeat request (ARQ), hybrid ARQ, and incremental redundancy repeat. Typically, different types of traffic are coded using different coding schemes. A modulator (MOD) 216 then receives pilot data and the coded data from TX data processor 214, and further processes the received data to generate modulated data.

Figure 3:
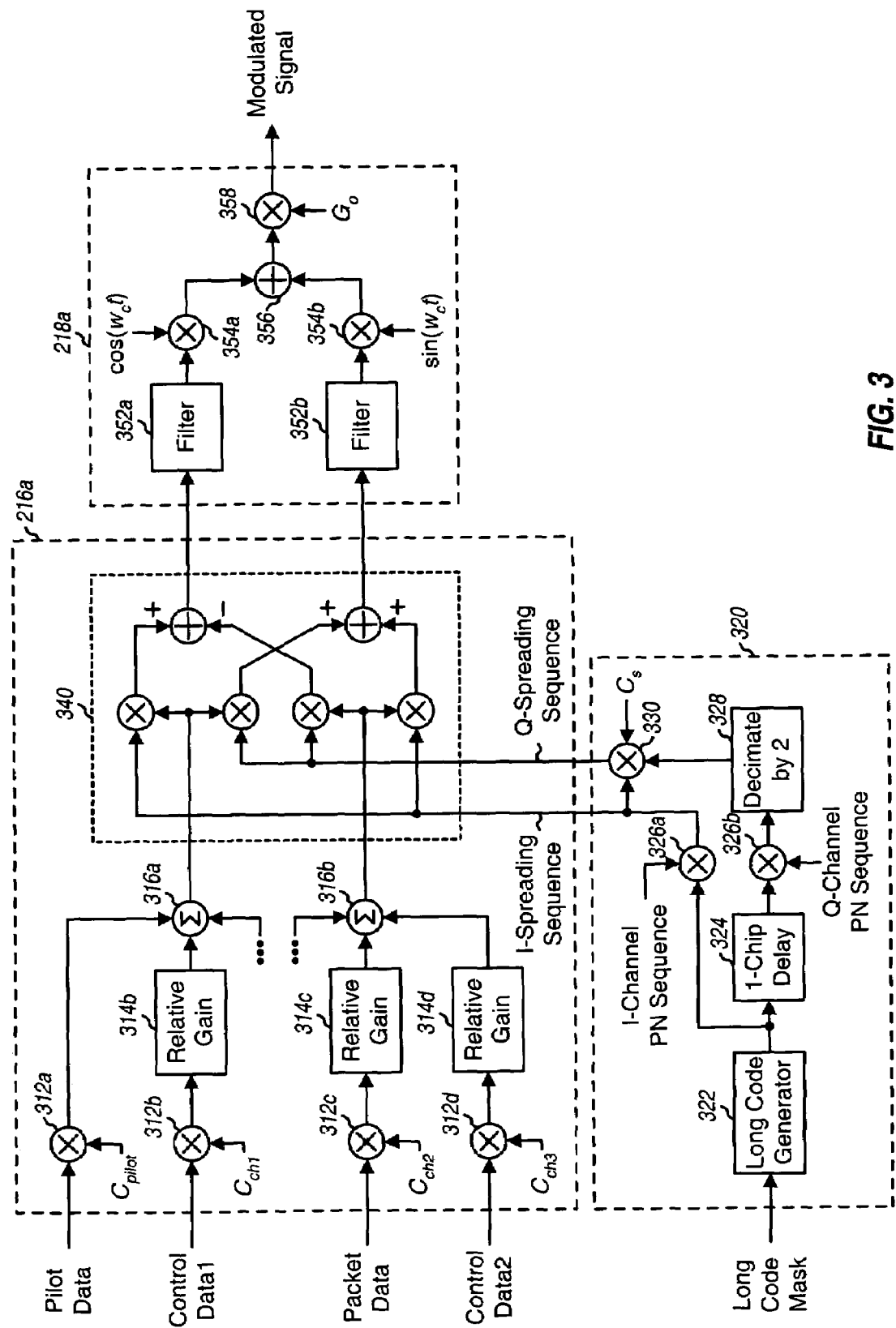
FIG. 3 is a block diagram of an embodiment of a modulator for the reverse link in cdma2000.

FIG. 3 is a block diagram of an embodiment of a modulator 216a, which may be used for modulator 216 in FIG. 2. For the reverse link in cdma2000, the processing by modulator 216a includes covering the data for each of a number of code channels (e.g., traffic, sync, paging, and pilot channels) with a respective Walsh code, $C_{ch,x}$, by a multiplier 312 to channelize the user-specific data (packet data), messages (control data), and pilot data onto their respective code channels. The channelized data for each code channel may be scaled with a respective gain, $G_i$, by a unit 314 to control the relative transmit power of the code channels. The scaled data for all code channels for the inphase (I) path is then summed by a summer 316a to provide I-channel data, and the scaled data for all code channels for the quadrature (Q) path is summed by a summer 316b to provide Q-channel data.

FIG. 3 also shows an embodiment of a spreading sequence generator 320 for the reverse link in cdma2000. Within generator 320, a long code generator 322 receives a long code mask assigned to the terminal and generates a long pseudo-random noise (PN) sequence with a phase determined by the long code mask. The long PN sequence is then multiplied with an I-channel PN sequence by a multiplier 326a to generate an I spreading sequence. The long PN sequence is also delayed by a delay element 324, multiplied with a Q-channel PN sequence by a multiplier 326b, decimated by a factor of two by element 328, and covered with a Walsh code ($C_s$=+−) and further spread with the I spreading sequence by a multiplier 330 to generate a Q spreading sequence. The I-channel and Q-channel PN sequences form the complex short PN sequence used by all terminals. The I and Q spreading sequences form the complex spreading sequence, $S_k$, that is specific to the terminal.

Within modulator 216a, the I-channel data and the Q-channel data ($D_{ch1}$+j$D_{chQ}$) are spread with the I and Q spreading sequences ($S_{kI}$+j$S_{kQ}$), via a complex multiply operation performed by a multiplier 340, to generate I spread data and Q spread data ($D_{SpI}$+j$D_{SpQ}$). The complex despreading operation may be expressed as:

$$D_{spI} + jD_{spQ} = (D_{ch1} + jD_{chQ}) \cdot (S_{kI} + jS_{kQ}), \quad \text{Eq (1)}$$
$$= (D_{ch1}S_{kI} - D_{chQ}S_{kQ}) + j(D_{ch1}S_{kQ} + D_{chQ}S_{kI}).$$

The I and Q spread data comprises the modulated data provided by modulator 216a.

The modulated data is then provided to a transmitter (TMTR) 218a and conditioned. Transmitter 218a is an embodiment of transmitter 218 in FIG. 2. The signal conditioning includes filtering the I and Q spread data with filters 352a and 352b, respectively, and upconverting the filtered I and Q data with cos($w_c$t) and sin($w_c$t), respectively, by multipliers 354a and 354b. The I and Q components from multipliers 354a and 354b are then summed by a summer 356 and further amplified with a gain, $G_o$, by a multiplier 358 to generate a reverse link modulated signal.

Referring back to FIG. 2, the reverse link modulated signal is then transmitted via an antenna 220 and over a wireless communication link to one or more base stations.

At base station 104, the reverse link modulated signals from a number of terminals are received by each of one or more antennas 250. Multiple antennas 250 may be used to provide spatial diversity against deleterious path effect such as fading. As an example, for a base station that supports three sectors, two antennas may be used for each sector and the base station may then include six antennas. Any number of antennas may thus be employed at the base station.

Each received signal is provided to a respective receiver (RCVR) 252, which conditions (e.g., filters, amplifies, downconverts) and digitizes the received signal to provide data samples for that received signal. Each receive signal may include one or more signal instances (i.e., multipaths) for each of a number of terminals.

A demodulator (DEMOD) 254 then receives and processes the data samples for all received signals to provide recovered symbols. For cdma2000, the processing by demodulator 254 to recover a data transmission from a particular terminal includes (1) despreading the data samples with the same spreading sequence used to spread the data at the terminal, (2) channelizing the despread samples to isolate or channelize the received data and pilot onto their respective code channels, and (3) coherently demodulating the channelized data with a recovered pilot to provide demodulated data. Demodulator 254 may implement a rake receiver that can process multiple signal instances for each of a number of terminals, as described below.

A receive (RX) data processor 256 then receives and decodes the demodulated data for each terminal to recover the user-specific data and messages transmitted by the terminal on the reverse link. The processing by demodulator 254 and RX data processor 256 is complementary to that performed by modulator 216 and TX data processor 214, respectively, at the terminal.

Figure 4:
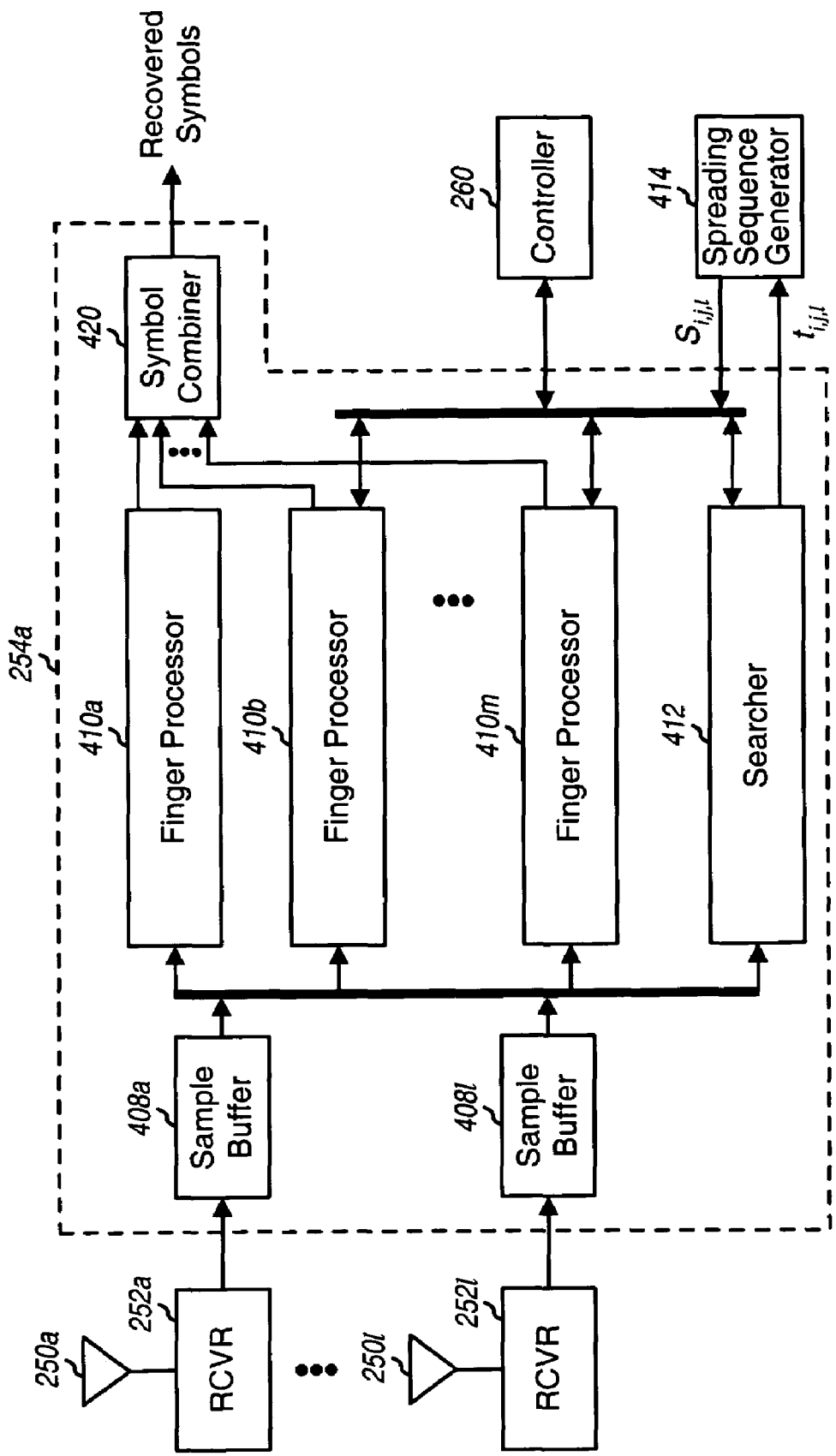
FIG. 4 is a block diagram of an embodiment of a rake receiver.

FIG. 4 is a block diagram of an embodiment of a rake receiver 254a, which is capable of receiving and demodulating the reverse link modulated signals from a number of terminals 106. Rake receiver 254a includes one or more (L) sample buffers 408, one or more (M) finger processors 410, a searcher 412, and a symbol combiner 420. The embodiment in FIG. 4 shows all finger processors 410 coupled to the same symbol combiner 420.

Due to the multipath environment, the reverse link modulated signal transmitted from each terminal 106 may arrive at base station 104 via a number of signal paths (as shown in FIG. 1), and the received signal for each base station antenna typically comprises a combination of different instances of the reverse link modulated signal from each of a number of terminals. Each signal instance (or multipath) in a received signal is typically associated with a particular magnitude, phase, and arrival time (i.e., a time delay or time offset relative to CDMA system time). If the difference between the arrival times of the multipaths is more than one PN chip at the base station, then each received signal, $y_l(t)$, at the input to a respective receiver 252 may be expressed as:

$$y_l(t) = \sum_j \sum_i p_{i,j,l}(t) x_j(t - \hat{t}_{i,j,l}) + n(t), \quad \text{Eq (2)}$$

where $x_j(t)$ is the j-th reverse link modulated signal transmitted by the j-th terminal;

$\hat{t}_{i,j,l}$ is the arrival time, at the l-th antenna, of the i-th multipath relative to the time the j-th reverse link modulated signal, $x_j(t)$, is transmitted;

$p_{i,j,l}(t)$ represents the channel gain and phase for the i-th multipath for the j-th terminal at the l-th antenna, and is a function of the fading process;

$$\sum_j$$

is the summation for all reverse link modulated signals in the l-th received signal;

$$\sum_i$$

is the summation for all multipaths of each reverse link modulated signal in the l-th received signal; and n(t) represents the real-valued channel noise at RF plus internal receiver noise.

Each receiver 252 amplifies and frequency downconverts a respective received signal, $y_l(t)$, and further filters the signal with a received filter that is typically matched to the transmit filter (e.g., filter 352) used at the terminal to provide a conditioned signal. Each receiver unit 252 then digitizes the conditioned signal to provide a respective stream of data samples, which is then provided to a respective sample buffer 408.

Each sample buffer 408 stores the received data samples and further provides the proper data samples to the appropriate processing units (e.g., finger processors 410 and/or searcher 412) at the appropriate time. In one design, each buffer 408 provides the data samples to a respective set of finger processors 410 assigned to process the multipaths in the received signal associated with the buffer. In another design, a number of buffers 408 provide data samples (e.g., in a time division multiplexed manner) to a particular finger processor that has the capability to process a number of multipaths in a time division multiplexed manner. Sample buffers 408a through 408l may also be implemented as a single buffer of the appropriate size and speed.

Searcher 412 is used to search for strong multipaths in the received signals and to provide an indication of the strength and timing of each found multipath that meets a set of criteria. The search for multipaths of a particular terminal is typically performed by correlating the data samples for each received signal with the terminal's spreading sequence, locally generated at various chip or sub-chip offsets (or phases). Due to the pseudo-random nature of the spreading sequence, the correlation of the data samples with the spreading sequence should be low, except when the phase of the locally-generated spreading sequence is time-aligned with that of a multipath, in which case the correlation results in a high value.

For each reverse link transmitted modulated signal, $x_j(t)$, searcher 412 may provide a set of one or more time offsets, $t_{i,j,l}$ for a set of one or more multipaths found for that reverse link modulated signal (possibly along with the signal strength of each found multipath). The time offsets, $t_{i,j,l}$ provided by searcher 412 are relative to the base station timing or CDMA system time, and are related to the time offsets, $\hat{t}_{i,j,l}$ shown in equation (2) which are relative to the time of signal transmission.

Searcher 412 may be designed with one or multiple searcher units, each of which may be designed to search for multipaths over a respective search window. Each search window includes a range of spreading sequence phases to be searched. The searcher units may be operated in parallel to speed up the search operation. Additionally or alternatively, searcher 412 may be operated at a high clock rate to speed up the search operation. Searcher and searching are described in further detail in U.S. Pat. Nos. 5,805,648, 5,781,543, 5,764,687, and 5,644,591, all of which are incorporated herein by reference.

Each finger processor 410 may then be assigned to process a respective set of one or more multipaths of interest (e.g., multipaths of sufficient strength, as determined by controller 260 based on the signal strength information provided by searcher 412). Each finger processor 410 then receives, for each assigned multipath, the following: (1) the data samples for the received signal that includes the assigned multipath, (2) either the time offset, $t_{i,j,l}$ of the assigned multipath or a spreading sequence, $S_{i,j,l}$ with a phase corresponding to the time offset, $t_{i,j,l}$ (which may be generated by a spreading sequence generator 414), and (3) the channelization code (e.g., the Walsh code) for the code channel to be recovered. Each finger processor 410 then processes the received data samples and provides demodulated data for each assigned multipath. The processing by finger processor 410 is described in further detail below.

Symbol combiner 420 receives and combines the demodulated data (i.e., the demodulated symbols) for each terminal. In particular, symbol combiner 420 receives the demodulated symbols for all assigned multipaths for each terminal and, depending on the design of the finger processors, may time-align (or deskew) the symbols to account for differences in the time offsets for the assigned multipaths. Symbol combiner 420 then combines the time-aligned demodulated symbols for each terminal to provide recovered symbols for the terminal. Multiple symbol combiners may be provided to concurrently combine symbols for multiple terminals. The recovered symbols for each terminal are then provided to RX data processor 256 and decoded.

The processing of the multipaths may be performed based on various demodulator designs. In a first demodulator design, one finger processor is assigned to process a number of multipaths in a received signal. For this design, the data samples from the sample buffer may be processed in "segments" covering a particular time duration (i.e., a particular number of PN chips) and starting at some defined time boundaries. In a second demodulator design, multiple finger processors are assigned to process multiple multipaths in the received signal. Various aspects and embodiments of the invention are described for the first demodulator design.

The pilot interference cancellation may also be performed based on various schemes. In a first pilot interference cancellation scheme that is based on the first demodulator design, the channel response of a particular multipath is estimated based on a segment of data samples, and the estimated channel response is then used to derive an estimate of the pilot interference due to this multipath for the same segment. This scheme may provide improved pilot interference cancellation. However, this scheme also introduces additional processing delays in the data demodulation for the multipath since the segment of data samples is first processed to estimate and cancel the pilot interference before the data demodulation can proceed on the same segment.

In a second pilot interference cancellation scheme that is also based on the first demodulator design, the channel response of a particular multipath is estimated based on a segment of data samples, and the estimated channel response is then used to derive an estimate of the pilot interference due to this multipath for the next segment. This scheme may be used to reduce (or possibly eliminate) additional processing delays in the data demodulation resulting from the pilot interference estimation and cancellation. However, since the link conditions may continually change over time, the time delay between the current and next segments should be kept sufficiently short such that the channel response estimate for the current segment is still accurate in the next segment. For clarity, the pilot interference estimation and cancellation are described below for the second scheme.

Figure 5:
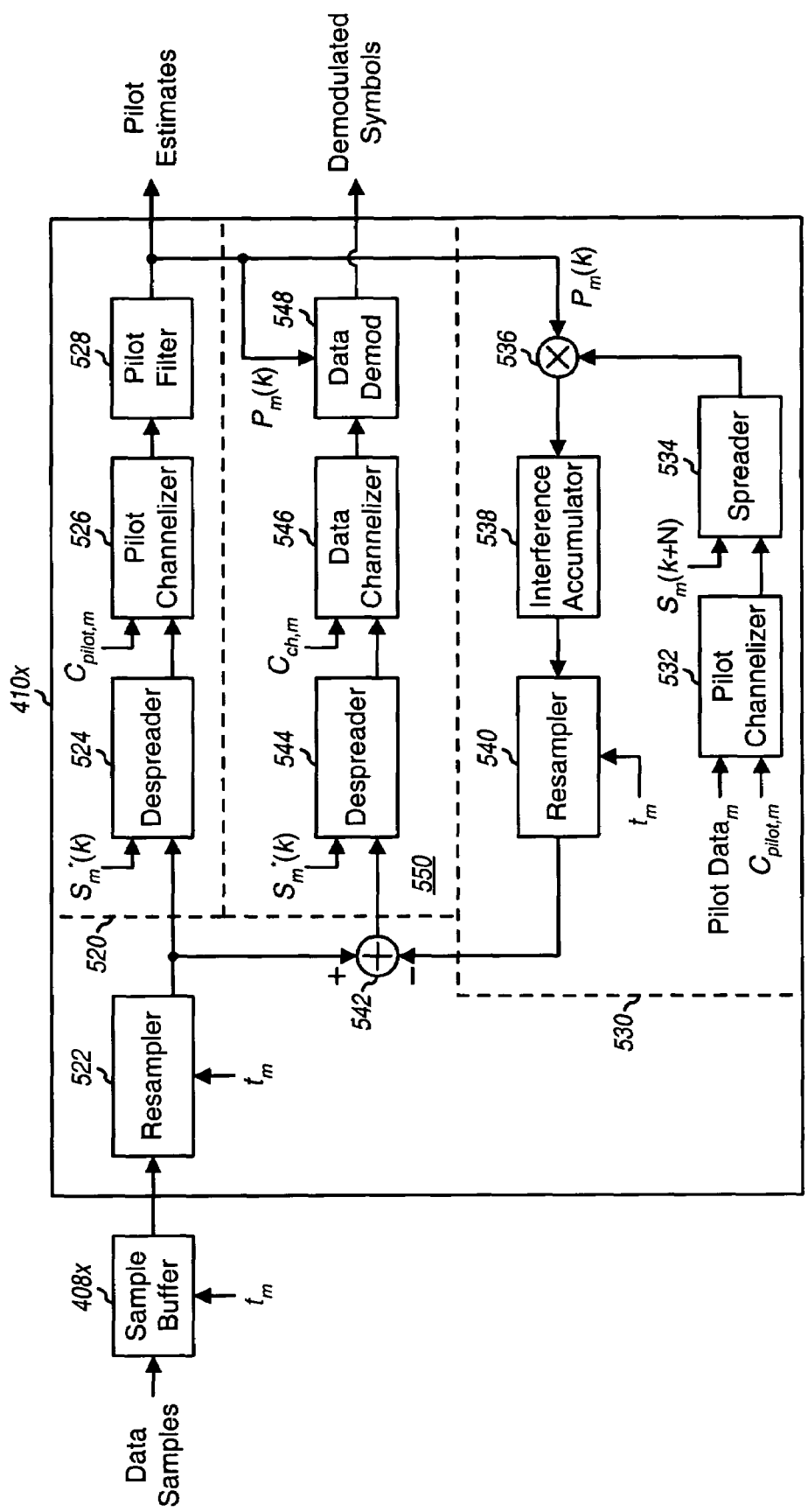
FIG. 5 is a block diagram of a specific embodiment of a finger processor within the rake receiver, which is capable of estimating and canceling pilot interference in addition to performing data demodulation.

FIG. 5 is a block diagram of a specific embodiment of a finger processor 410x, which is capable of estimating and canceling pilot interference in addition to performing the data demodulation. Finger processor 410x may be used for each finger processor 410 in rake receiver 254a shown in FIG. 4. In the following description, FIG. 5 shows the processing elements and FIGS. 6A and 6B graphically show the timing for the pilot interference estimation and cancellation.

Finger processor 410x is assigned to demodulate one or more "desired" multipaths in a particular received signal. Sample buffer 408x stores data samples for the received signal that includes the multipaths assigned to finger processor 410x. Buffer 408x then provides the appropriate data samples (in segments) to the finger processor when and as they are needed. In the embodiment shown in FIG. 5, finger processor 410x includes a resampler 522, a pilot estimator 520 (or channel estimator), a summer 542, a data demodulation unit 550, and a pilot interference estimator 530.

For each desired multipath to be demodulated by finger processor 410x, the data in all other multipaths and the pilots in all multipaths in the same received signal act as interference to this multipath. Since the pilot is generated based on a known data pattern (e.g., typically a sequence of all zeros) and processed in a known manner, the pilots in the "interfering" multipaths may be estimated and removed from the desired multipath to improve the signal quality of the data component in the desired multipath. Finger processor 410x is capable of estimating and canceling the pilot interference due to a number of multipaths found in the received signal, including the pilot of the desired multipath, as described below.

In an embodiment, the pilot interference estimation and cancellation and the data demodulation are performed in "bursts". For each burst (i.e., each processing cycle), a segment of data samples for a particular number of PN chips are processed to estimate the pilot interference due to a particular multipath. In a specific embodiment, each segment comprises data samples for one symbol period, which may be 64 PN chips for cdma2000. However, other segment sizes may also be used (e.g., for data symbols of other durations), and this is within the scope of the invention. As described below, the data demodulation may be performed in parallel and in a pipelined manner with the pilot interference estimation to increase processing throughput and possibly reduce the overall processing time.

To derive an estimate of the pilot interference due to the m-th multipath (where m=(i, j, l) and is the notation for the i-th multipath for the j-th reverse link modulated signal found in the l-th received signal), a segment of data samples is initially provided from buffer 408x to a resampler 522 within finger processor 410x. Resampler 522 may then perform decimation, interpolation, or a combination thereof, to provide decimated data samples at the chip rate and with the proper "fine-grain" timing phase.

Figure 6A:
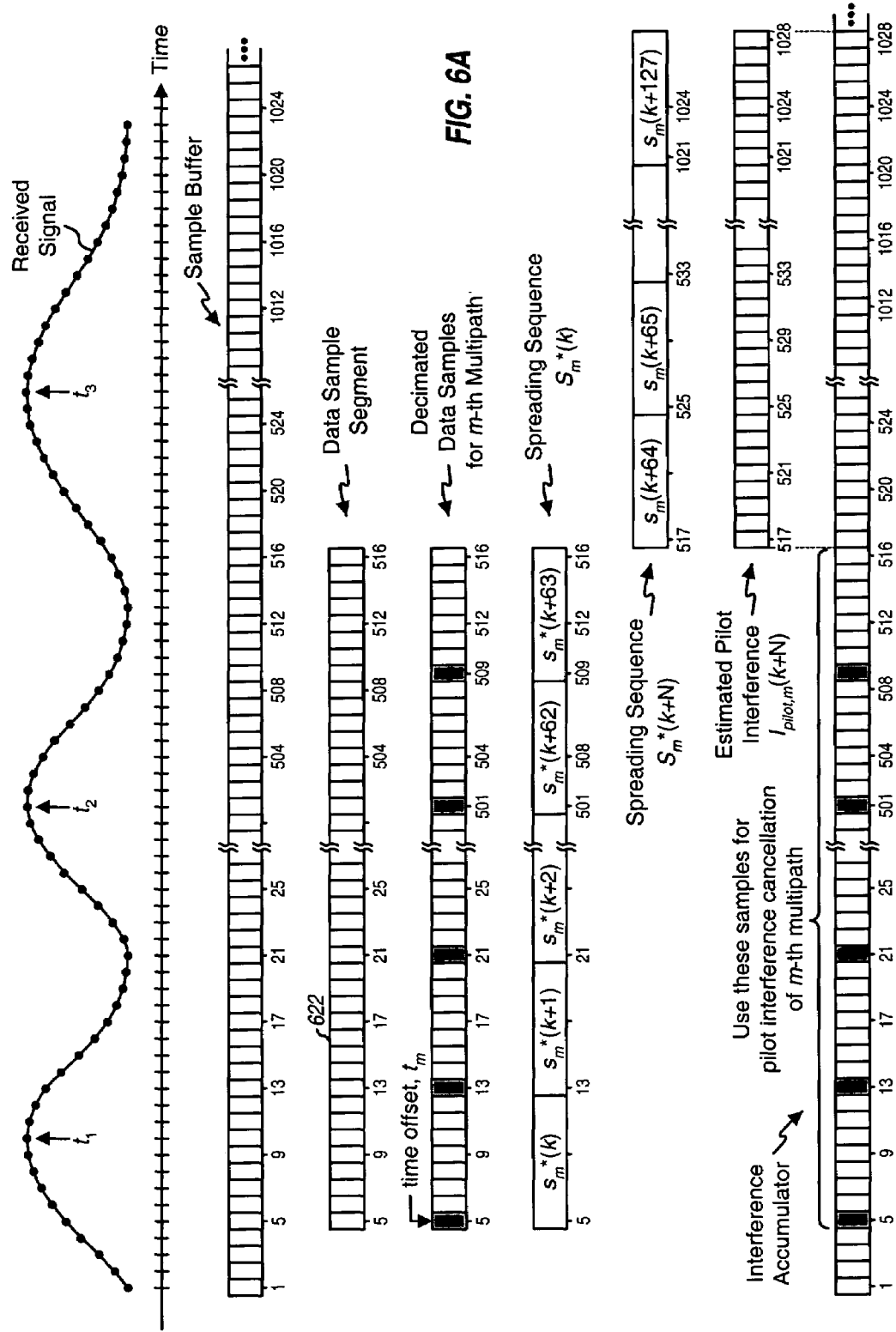
FIGS. 6A and 6B are diagrams that graphically illustrate the processing of the data samples to derive estimates of pilot interference, in accordance with a specific implementation.

FIG. 6A graphically illustrates an embodiment of the resampling performed by resampler 522. The received signal is typically oversampled at a sample rate that is multiple (e.g., 2, 4, or 8) times the chip rate to provide higher time resolution. The data samples are stored to sample buffer 408x, which thereafter provides a segment of (e.g., 512) data samples for each processing cycle. Resampler 522 then "resamples" the data samples received from buffer 408x to provide samples at the chip rate and with the proper timing phase.

As shown in FIG. 6A, if the received signal is sufficiently oversampled (e.g., at 8 times the chip rate), then the resampling for the m-multipath may be performed by providing every, e.g., 8-th data sample received from the buffer, with the selected data samples being the ones most closely aligned to the timing of the peak of the m-th multipath. The m-th multipath is typically a multipath assigned for data demodulation, and the multipath's time offset, $t_m$, may be determined and provided by searcher 412. However, pilot interference due to multipaths that are not assigned for data demodulation may also be estimated and canceled, so long as the time offset of each such multipath is known. Each multipath's time offset, $t_m$, may be viewed as comprising an integer number of symbol periods and a fractional portion of a symbol period (i.e., $t_m = t_{full,m} + t_{frac,m}$) relative to the base station timing or CDMA system time, where a symbol period is determined by the length of the channelization code (e.g., 64 PN chips for cdma2000). The fractional part of the time offset, $t_{frac,m}$, may be used to select the particular segment of data samples to provide to resampler 522 and for decimation. In the example shown in FIG. 6A, the fractional part of the time offset for the m-th multipath is $t_{frac,m}=5$, data sample segment 622 is provided by buffer 408x, and the decimated data samples provided by resampler 522 are represented by the shaded boxes.

For other receiver design in which the received signal is not sufficiently oversampled, then interpolation may alternatively or additionally be performed along with decimation to derive new samples at the proper timing phase, as is known in the art.

Within pilot estimator 520, a despreader 524 receives the decimated data samples and a (complex-conjugate) spreading sequence, $S_m^*(k)$, having a phase corresponding to the time offset, $t_m$, of the m-th multipath whose pilot interference is to be estimated. The spreading sequence, $S_m^*(k)$, may be provided by spreading sequence generator 414. For the reverse link in cdma2000, the spreading sequence, $S_m^*(k)$, may be generated as shown for spreading sequence generator 320 in FIG. 3. And as shown in FIG. 6A, a segment of the spreading sequence, $S_m^*(k)$, of the same length and with the same timing phase as the data sample segment is used for the despreading (i.e., the spreading sequence, $S_m^*(k)$ is time-aligned with the decimated data samples).

Despreader 524 (which may be implemented as a complex multiplier such as multiplier 340 shown in FIG. 3) despreads the decimated data samples with the spreading sequence, $S_m^*(k)$, and provides despread samples. A pilot channelizer 526 then multiplies the despread samples with the channelization code, $C_{pilot,m}$, used for the pilot at the terminal (e.g., a Walsh code of zero for cdma2000). The decovered pilot samples are then accumulated over a particular accumulation time interval to provide pilot symbols. The accumulation time interval is typically an integer multiple of the pilot channelization code length. If the pilot data is covered with a channelization code of zero (as in cdma2000), then the multiplication with the channelization code, $C_{pilot,m}$, may be omitted and pilot channelizer 526 simply performs the accumulation of the despread samples from despreader 524. In a specific embodiment, one pilot symbol is provided for each segment, which has a size of one symbol period.

The pilot symbols from pilot channelizer 526 are then provided to a pilot filter 528 and filtered based on a particular lowpass filter response to remove noise. Pilot filter 528 may be implemented as a finite impulse response filter (FIR), an infinite impulse response (IIR) filter, or some other filter structure. Pilot filter 528 provides pilot estimates, $P_m(k)$, which are indicative of the channel response (i.e., the gain and phase, $a_m \cdot e^{j\theta_m}$) of the m-th multipath. Each pilot estimate, $P_m(k)$, is thus a complex value. The pilot estimates are provided at sufficient rate such that non-insignificant changes in the channel response of the multipath are captured and reported. In a specific embodiment, one pilot estimate is provided for each segment, which has a size of one symbol.

Pilot interference estimator 530 then estimates the pilot interference due to the m-th multipath for the next segment. To estimate the pilot interference, the pilot data and the pilot channelization code, $C_{pilot,m}$, for the m-th multipath are provided to a pilot channelizer 532, which channelizes the pilot data with the pilot channelization code to provide channelized pilot data. A spreader 534 then receives and spreads the channelized pilot data with a spreading sequence, $S_m(k+N)$, to generate spread pilot data (i.e., processed pilot data). The spreading sequence, $S_m(k+N)$, has a phase corresponding to the time offset, $t_m$, of the m-th interfering multipath and is further advanced by N PN chips for the next segment, as shown in FIG. 6A. If the pilot data is a sequence of all zeros and the pilot channelization code is also a sequence of all zeros (as in cdma2000), then pilot channelizer 532 and spreader 534 may be omitted and the spread pilot data is simply the spreading sequence, $S_m(k+N)$.

A multiplier 536 then receives and multiplies the spread pilot data with the pilot estimates, $P_m(k)$, from pilot filter 528 to provide an estimate of the pilot interference, $I_{pilot,m}(k+N)$, due to the m-th multipath for the next segment. Since the pilot estimates, $P_m(k)$, are derived from the current segment and used to derive the estimated pilot interference for the next segment, prediction techniques may be used to derive pilot predictions for the next segment based on the pilot estimates. These pilot predictions may then be used to derive the estimated pilot interference for the next segment.

In an embodiment, multiplier 536 provides the estimated pilot interference due to the m-th multipath at the sample rate (e.g., 8× the chip rate) and with the timing phase of the m-th multipath. This allows the estimated pilot interferences for all multipaths (which have different time offsets that are typically not all aligned to the PN chip timing boundaries) to be accumulated at a higher time resolution. The estimated pilot interference, $I_{pilot,m}(k+N)$, for the m-th multipath, which includes the same number of interference samples as for the data sample segment, is then provided to an interference accumulator 538. As shown in FIG. 6A, the interference samples for the m-th multipath are stored (or accumulated with the interference samples already stored) at locations in the accumulator 538 determined by the fractional part of the multipath's time offset.

To derive the total pilot interference for all multipaths in a given received signal, the processing described above may be iterated a number of times, one iteration or processing cycle for each interfering multipath for which the pilot interference is to be estimated and canceled from a desired multipath. The pilot interference cancellation is typically performed for the multipaths received via the same antenna, not cross antennas, because the channel estimate from one antenna is typically not good for another antenna. If the same finger processor hardware is used for multiple iterations, then the processing may be performed in bursts, with each burst being performed on a respective segment of data samples determined by the multipath's fractional time offset.

Prior to the first iteration, accumulator 538 is cleared or reset. For each iteration, the estimated pilot interference, $I_{pilot,m}$, due to the current multipath is accumulated with the accumulated pilot interference for all prior-processed multipaths. However, as shown in FIG. 6A, the estimated pilot interference, $I_{pilot,m}$, is accumulated with samples in a specific section of accumulator 538, which is determined by the current multipath's time offset. After all interfering multipaths have been processed, the accumulated pilot interference in accumulator 538 comprises the total pilot interference, $I_{pilot}$, due to all processed multipaths.

FIG. 6A also shows an embodiment of accumulator 538. While finger processor 410x performs data demodulation for the m-th multipath for the current segment (using the total pilot interference, $I_{pilot}(k)$, derived earlier and stored in one section of accumulator 538), the pilot interference due to the m-th multipath, $I_{pilot,m}(k+N)$, for the next segment may be estimated and accumulated in another section of the accumulator.

The pilot for the m-th multipath is interference to all multipaths in the received signal, including the m-th multipath itself. For a demodulator design in which the multiple finger processors are assigned to process a number of multipaths in a received signal for a given terminal, the estimated pilot interference, $I_{pilot,m}$, due to the m-th multipath may be provided to other finger processors assigned to process other multipaths in the same received signal.

For the demodulation to recover the data on the m-th multipath, the data samples for a segment are provided from buffer 408x to resampler 522. Resampler 522 then resamples the received data samples to provide decimated data samples at the chip rate and with the proper timing phase for this multipath. The decimated data samples are processed as described above to provide the pilot estimates, $P_m(k)$.

Correspondingly, interference samples for the total pilot interference, $I_{pilot}(k)$, for the same segment are provided from accumulator 538 to a resampler 540. Resampler 540 similarly resamples the received interference samples to provide decimated interference samples at the chip rate and with the proper timing phase for the m-th multipath. Summer 542 then receives and subtracts the decimated interference samples from the decimated data samples to provide pilot-canceled data samples.

Within data demodulation unit 550, a despreader 544 receives and despreads the pilot-canceled data samples with a (complex-conjugate) spreading sequence, $S_m^*(k)$, to provide despread samples. The spreading sequence, $S_m^*(k)$, has a phase corresponding to the time offset, $t_m$, of the m-th multipath. A data channelizer 546 then multiplies the despread samples with the channelization code, $C_{ch,m}$, used for the code channel being recovered by the finger processor. The channelized data samples are then accumulated over the length of the channelization code, $C_{ch,m}$, to provide data symbols.

A data demodulator 548 then receives and demodulates the data symbols with the pilot estimates, $P_m(k)$, to provide demodulated symbols (i.e., demodulated data) for the m-th multipath, which are then provided to symbol combiner 420. The data demodulation and symbol combining may be achieved as described in the aforementioned U.S. Pat. No. 5,764,687 patent. The '687 patent describes BPSK data demodulation for IS-95 by performing dot product between the despread data and the filtered pilot. The demodulation of QPSK modulation, which is used in cdma2000 and W-CDMA, is a straight-forward extension of the techniques described in the '687 patent. That is, instead of dot product, both dot product and cross-product are used to recover the inphase and quadrature streams.

As noted above, the data demodulation for the m-th multipath may be performed in parallel and in a pipelined manner with the pilot interference estimation. While despreader 544 and data channelizer 546 are processing the pilot-canceled data samples for the current segment (with the spreading sequence, $S_m^*(k)$, and the channelization code, $C_{ch,m}$) to provide the data symbols for the m-th multipath, despreader 524 and pilot channelizer 526 may process the same data samples for the current segment (with the spreading sequence, $S_m^*(k)$, and the pilot channelization code, $C_{pilot,m}$) to provide the pilot symbols for this multipath. The pilot symbols are filtered by pilot filter 528 to provide pilot estimates, $P_m(k)$, for the multipath. Pilot interference estimator 530 then derives the estimated pilot interference, $I_{pilot,m}(k+N)$, due to this multipath for the following segment, as described above. In this manner, while data demodulation is performed on the current segment using the total pilot interference, $I_{pilot}(k)$, derived from a prior segment, pilot interference for the next segment is estimated and stored to another section of the accumulator 538, to be used for the next segment.

In an embodiment, the pilot for a particular multipath being demodulated is estimated based on the "raw" received data samples (from sample buffer 408x) as described above, and not based on the pilot-canceled data samples (from accumulator 538). In another embodiment, the pilot may be estimated based on the pilot-canceled data samples if the total pilot interference includes some or all of the interfering pilots except for the pilot of the multipath being demodulated (i.e., the pilot of the multipath being demodulated is included in the "other pilots canceled" data samples). This alternative embodiment may provide an improved estimate of the channel response of the multipath being demodulated, and is especially advantageous for the reverse link where the pilot estimation is typically the limiting factor in dealing with a weak multipath. The same "other pilots canceled" data samples that is used for pilot estimation may also be processed to recover the data for the multipath, which is advantageous for a finger processor architecture that performs both pilot estimation and data demodulation in parallel on the same data sample stream. The same concept may be used to estimate the channel response of a particular interfering multipath (i.e., the estimated channel response may be based on either the raw data samples or the "other pilots canceled" data samples having interfering pilots except for the pilot of that particular multipath removed).

Figure 6B:
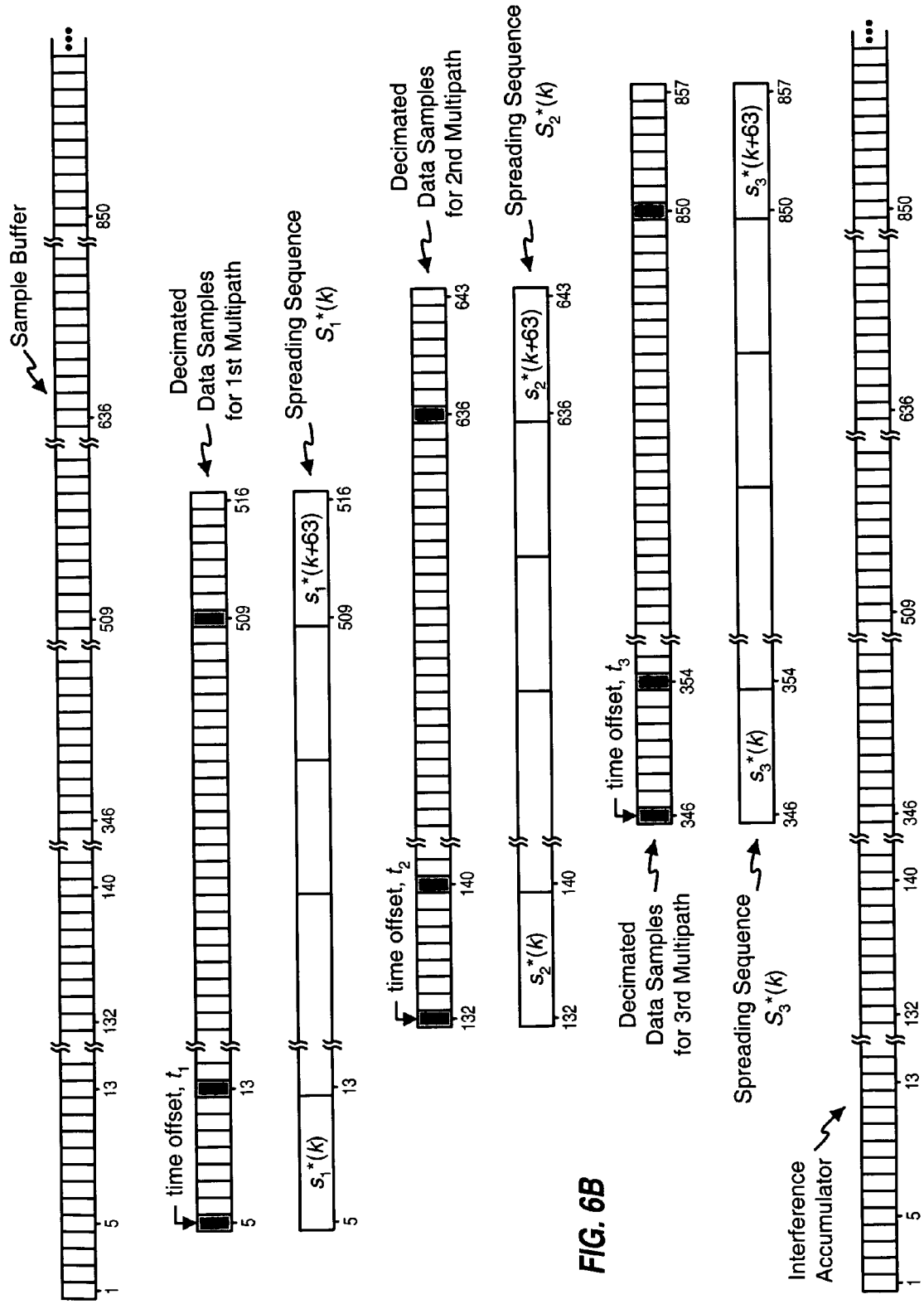

FIGS. 6A and 6B are diagrams that illustrate the processing of the data samples to derive estimates of pilot interference, in accordance with a specific implementation. In the example shown in FIGS. 6A and 6B, the received signal includes three multipaths that are associated with time offsets of $t_1$, $t_2$, and $t_3$. The received signal is digitized at a sample rate that is 8 times the chip rate to provide data samples, which are stored to the sample buffer 408. These multipaths may or may not be sampled at their peaks.

In the example shown in FIGS. 6A and 6B, each segment included 512 data samples for a symbol period of 64 PN chips. The pilot interference is estimated for each of the three multipaths and for each symbol period. The symbol timing for each multipath is determined by the multipath's fractional time offset. If the fractional time offsets of the multipaths are not the same, which is generally true, then the symbol timing for these multipaths will be different and will be associated with different data sample segments. In an embodiment, the multipaths are processed in an order based on their fractional time offsets, with the multipath having the smallest fractional time offset being processed first and the multipath having the largest fractional time offset being processed last. This processing order ensures that the total pilot interference is derived and available for each multipath when it is processed.

In FIG. 6A, for the n-th symbol period for the m-th multipath with a fractional time offset of $t_{frac,m}$=5, resampler 522 receives data samples 5 through 516 from the sample buffer and provides to despreader 524 data samples 5, 13, 21, and so on, and 509, which are represented by the shaded boxes. Correspondingly, despreader 524 receives the spreading sequence, $S_m^*(k)$, with a phase corresponding to the same time offset of $t_m$, and despreads the decimated data samples with the spreading sequence. A pilot estimate, $P_m(k)$, is then derived based on the despread samples for this segment, as described above.

To derive the estimated pilot interference due to the m-th multipath, spreader 534 receives the spreading sequence, $S_m(k+N)$, corresponding to the next segment and spreads channelized pilot data. Multiplier 536 then multiplies the spread pilot data (spread by spreading sequence, $S_m(k+N)$), with the pilot estimate, $P_m(k)$, derived from the current segment to provide the estimated pilot interference, $I_{pilot,m}(k+N)$, for the next segment. The estimated pilot interference, $I_{pilot,m}(k+N)$, comprises interference samples 517 through 1028, which are accumulated with the samples at the same indices 517 through 1028 in the interference accumulator 538 as shown in FIG. 6A. In this way, the fractional time offset of the m-th multipath is accounted for in the derivation of the total pilot interference.

For the data demodulation of the m-th multipath for the n-th symbol period, the same segment of interference samples 5 through 516 are provided from accumulator 538 to resampler 540. Resampler 540 then provides to summer 542 interference samples 5, 13, 21, and so on, and 509 (which are also shown by the shaded boxes), corresponding to the same-indexed data samples provided by resampler 522. The data demodulation of the pilot-canceled data samples is then performed as described above. Each multipath may be processed in similar manner. However, since each multipath may be associated with a different time offset, different decimated data and interference samples may be operated on.

FIG. 6B shows the three data sample segments, the decimated data samples, and the three spreading sequences used to derive the estimated pilot interferences due to the three multipaths.

In another demodulator design, the pilot interference estimation/cancellation and the data demodulation may be performed in real-time (e.g., as data samples are received), if sufficient processing capabilities are provided. For example, M finger processors may be assigned to concurrently process M multipaths in a received signal. For each symbol period, each finger processor can derive a pilot estimate for that symbol period, which is then used to derive the estimated pilot interference due to that finger processor's assigned multipath for the next symbol period. A summer then sums the estimated pilot interferences from all M finger processors (taken into account their respective time offsets), and the total pilot interference for the next symbol period is stored in the interference accumulator.

The total pilot interference may then be subtracted from the data samples as they are received for the next symbol period, and the same pilot-canceled data samples may be provided to all M finger processors for data demodulation. (These finger processors are also provided with the received data samples, without the pilot cancellation, which are used to derive the pilot estimates.) In this way, the data demodulation may be performed on pilot-canceled data samples in real time, and the sample buffer may possibly be eliminated. For the scheme in which the pilot estimate is used to derive the estimated pilot interference for the same segment (and not the next segment), the data samples may be temporarily stored (e.g., for one symbol period) while the total pilot interference is derived.

For the demodulator design in which the same data samples are processed multiple times (e.g., if one finger processor is assigned to process a number of multipaths), the sample buffer 408 may be designed and operated in a manner to ensure that the data samples are not inadvertently dropped. In an embodiment, the sample buffer is designed to receive incoming data samples while providing stored data samples to the finger processor(s). This may be achieved by implementing the sample buffer in a manner such that stored data samples may be read from one part of the buffer while new data samples are written into another part of the buffer. The sample buffer may be implemented as a double buffer or multiple buffers, a multi-port buffer, a circular buffer, or some other buffer design. The interference accumulator 538 may be implemented in similar manner as the sample buffer 408 (e.g., as a circular buffer).

For the above demodulator design, to avoid overwriting samples that are still being processed, the capacity of the sample buffer 408 may be selected to be at least twice the time required to derive the total pilot interference for all M multipaths (with the relationship between time and buffer capacity being defined by the sample rate). If a different data sample segment may be used for each of the M multipaths, then the capacity of the sample buffer may be selected to be at least $(2 \cdot N \cdot N_{os})$ for each received signal assigned to the sample buffer, where N is the duration of data samples used to derive the estimated pilot interference for one multipath, and $N_{os}$ is the oversampling factor for the data samples (which is defined as the ratio of the sample rate over the chip rate). For the above example in which a segment of one symbol period (e.g., N=64 PN chips) is processed for each multipath, a buffer of two symbol periods would be able to provide a segment of one symbol period of data samples for each multipath regardless of its fractional time offset. And if the oversample rate is $N_{os}=8$, then the minimum size of the buffer is $(2 \cdot N \cdot N_{os}=2 \cdot 64 \cdot 8=1024)$ data samples.

Similarly, the capacity of the interference accumulator 538 may be selected to be at least $(3 \cdot N \cdot N_{os})$. The extra symbol period for the interference accumulator (i.e., $3 \cdot N$ instead of $2 \cdot N$) is to account for the fact that the estimated pilot interference is derived for the next segment.

As noted above, the estimated pilot interference derived from one data sample segment may be cancelled from a later data sample segment. For a mobile terminal, the communication link and, consequently, the channel response of the various multipaths are constantly changing. Therefore, it is desirable to reduce the delay between the data samples from which the pilot interference is estimated and the data samples from which that estimated pilot interference is canceled. This delay may be as great as $2 \cdot N$ chips.

By selecting a sufficiently small value for N, the channel response of each multipath may be expected to remain relatively constant over the period of $2 \cdot N$ chips. However, the value of N should be selected to be large enough to allow for an accurate estimate of the channel response of each multipath to be processed.

Figure 7:
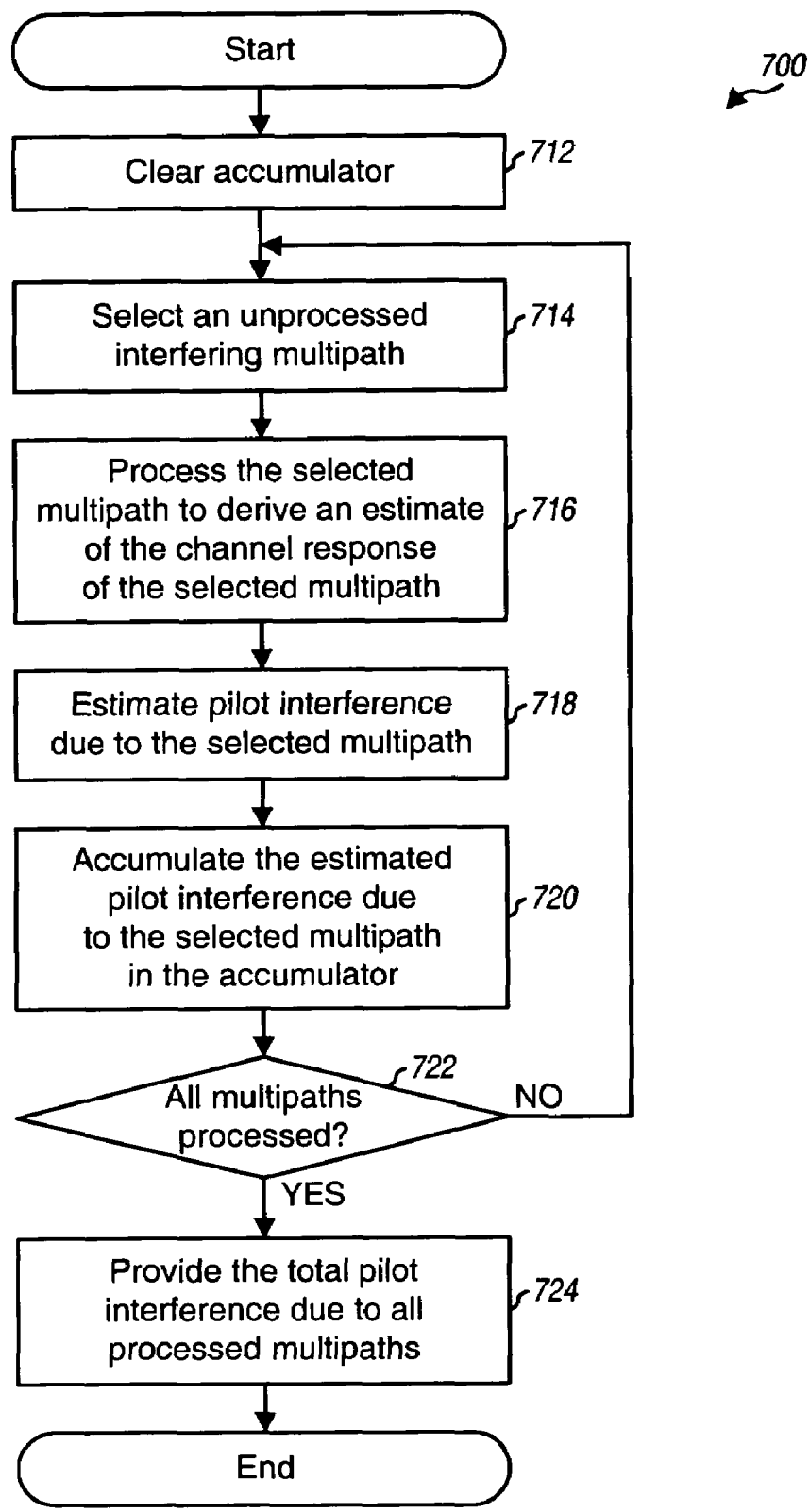
FIG. 7 is a flow diagram of an embodiment of a process to derive the total pilot interference for a number of multipaths.

FIG. 7 is a flow diagram of a process 700 to derive the total pilot interference for a number of multipaths, in accordance with an embodiment of the invention. Process 700 may be implemented by the finger processor 410 shown in FIG. 5.

Initially, the accumulator 538 used to accumulate the estimated pilot interferences is cleared, at step 712. An interfering multipath that has not been processed is then selected, at step 714. Typically, the pilot interference is estimated for each multipath assigned for data demodulation. However, pilot interference due to unassigned multipaths may also be estimated. In general, any number of interfering multipaths may be processed, and these multipaths are those for which the pilot interference is to be estimated and accumulated to derive the total pilot interference.

The data samples for the received signal with the selected multipath is then processed to derive an estimate of the channel response of the selected multipath, at step 716. The channel response may be estimated based on the pilot in the selected multipath, as described above. For cdma2000, this processing entails (1) despreading the data samples with a spreading sequence for the multipath (i.e., with the proper phase corresponding to the time offset of the multipath), (2) channelizing the despread data samples to provide pilot symbols (e.g., multiplying the despread samples with the pilot channelization code and accumulating the channelized data samples over the pilot channelization code length), and (3) filtering the pilot symbols to derive pilot estimates that are indicative of the channel response of the selected multipath. Estimation of the channel response based on some other techniques may also be used, and this is within the scope of the invention.

The pilot interference due to the selected multipath is then estimated, at step 718. The pilot interference may be estimated by generating processed pilot data and multiplying this data with the estimated channel response derived in step 716. The processed pilot data is simply the spreading sequence for the selected multipath if the pilot data is a sequence of all zeros and the pilot channelization code is also all zeros. In general, the processed pilot data is the pilot data after all signal processing at the transmitter unit but prior to the filtering and frequency upconversion (e.g., the data at the output of modulator 216a in FIG. 3 for the reverse link in cdma2000).

The estimated pilot interference for the selected multipath is then accumulated in the interference accumulator 538 with the estimated pilot interferences for prior-processed multipaths, at step 720. As noted above, the timing phase of the multipath is observed in performing steps 716, 718, and 720.

A determination is then made whether or not all interfering multipaths have been processed, at step 722. If the answer is no, then the process returns to step 714 and another interfering multipath is selected for processing. Otherwise, the content of the accumulator 538 represents the total pilot interference due to all processed multipaths, which may be provided in step 724. The process then terminates.

The pilot interference estimation in FIG. 7 may be performed for all multipaths in a time-division multiplexed manner using one or more finger processors. Alternatively, the pilot interference estimation for multiple multipaths may be performed in parallel using a number of finger processors. In this case, if the hardware has sufficient capabilities, then the pilot interference estimation and cancellation may be performed in real-time along with the data demodulation (e.g., as the data samples are received, with minimal or no buffering, as described above).

Figure 8:
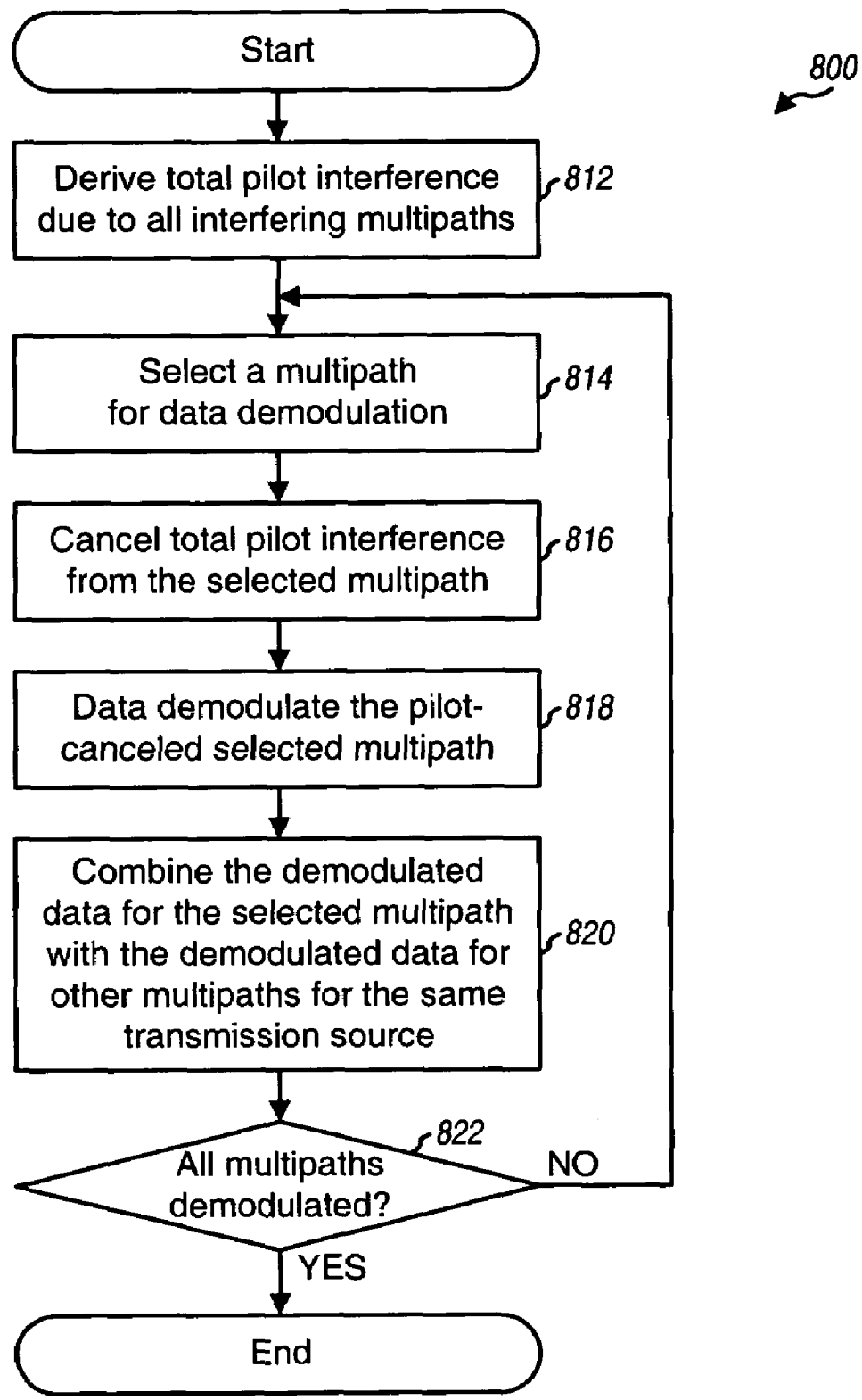
FIG. 8 is a flow diagram of an embodiment of a process to data demodulate a number of multipaths with pilot interference cancellation.

FIG. 8 is a flow diagram of a process 800 to data demodulate a number of multipaths with pilot interference cancellation, in accordance with an embodiment of the invention. Process 800 may also be implemented by the finger processor shown in FIG. 5.

Initially, the total pilot interference due to all multipaths of interest is derived, at step 812. Step 812 may be implemented using process 700 shown in FIG. 7. A particular multipath is then selected for data demodulation, at step 814. In an embodiment and as described above, the total pilot interference is initially canceled from the selected multipath, at step 816. This may be achieved by subtracting the interference samples for the total pilot interference (which are stored in the accumulator 538) from the data samples for the received signal that includes the selected multipath.

Data demodulation is then performed on the pilot-canceled signal in the normal manner. For cdma2000, this entails (1) despreading the pilot-canceled data samples, (2) channelizing the despread data to provide data symbols, and (3) demodulating the data symbols with the pilot estimates. The demodulated symbols (i.e., the demodulated data) for the selected multipath are then combined with the demodulated symbols for other multipaths for the same transmitter unit (e.g., terminal). The demodulated symbols for multipaths in multiple received signals (e.g., if receive diversity is employed) may also be combined. The symbol combining may be achieved by the symbol combiner 420 shown in FIG. 4.

A determination is then made whether or not all assigned multipaths have been demodulated, at step 822. If the answer is no, then the process returns to step 814 and another multipath is selected for data demodulation. Otherwise, the process terminates.

As noted above, the data demodulation for all assigned multipaths of a given transmitter unit may be performed in a time-division multiplexed manner using one or more finger processors. Alternatively, the data demodulation for all assigned multipaths may be performed in parallel using a number of finger processors.

Referring back to FIGS. 4 and 5, searcher 412 may be designed and operated to search for new multipaths based on the pilot-canceled data samples (instead of the raw received data samples from buffers 408). This may provide improved search performance since the pilot interference from some or all known multipaths may have been removed as described above.

The pilot interference cancellation techniques described herein may be able to provide noticeable improvement in performance. The pilot transmitted by each terminal on the reverse link contributes to the total channel interference, $I_o$, in a similar manner as background noise, $N_o$. The pilots from all terminals may represent a substantial part of the total interference level seen by all terminals. This would then result in a lower signal-to-total-noise-plus-interference ratio (SNR) for the individual terminal. In fact, it is estimated that in a cdma2000 system (which supports pilots on the reverse link) operating near capacity, approximately half of the interference seen at a base station may be due to the pilots from the transmitting terminals. Cancellation of the pilot interference may thus improve the SNR of each individual terminal, which then allows each terminal to transmit at a lower power level and increase the reverse link capacity.

The techniques described herein for estimating and canceling pilot interference may be advantageously used in various wireless communication systems that transmit a pilot along with data. For example, these techniques may be used for various CDMA systems (e.g., cdma2000, IS-95, W-CDMA, TS-CDMA, and so on), Personal Communication Services (PCS) systems (e.g., ANSI J-STD-008), and other wireless communication systems. The techniques described herein may be used to estimate and cancel pilot interference in cases where multiple instances of each of one or more transmitted signals are received and processed (e.g., by a rake receiver or some other demodulator) and also in cases where multiple transmitted signals are received and processed.

For clarity, various aspects and embodiments of the invention have been described for the reverse link in cdma2000. The pilot interference cancellation techniques described herein may also be used for the forward link from the base station to the terminal. The processing by the demodulator is determined by the particular CDMA standard being supported and whether the inventive techniques are used for the forward or reverse link. For example, the "despreading" with a spreading sequence in IS-95 and cdma2000 is equivalent to the "descrambling" with a it scrambling sequence in W-CDMA, and the channelization with a Walsh code or a quasi-orthogonal function (QOF) in IS-95 and cdma2000 is equivalent to the "despreading" with an OVSF code in W-CDMA. In general, the processing performed by the demodulator at the receiver is complementary to that performed by the modulator at the transmitter unit.

For the forward link, the techniques described herein may also be used to approximately cancel other pilots that may be transmitted in addition to, or possibly in place of, a "common" pilot transmitted to all terminals in a cell. For example, cdma2000 supports a "transmit diversity" pilot and an "auxiliary" pilot. These other pilots may utilize different Walsh codes (i.e., different channelization codes, which may be quasi-orthogonal functions). A different data pattern may also be used for the pilot. To process any of these pilots, the despread samples are decovered with the same Walsh code used to channelize the pilot at the base station, and further correlated (i.e., multiplied and accumulated) with the same pilot data pattern used at the base station for the pilot. The transmit diversity pilot and/or auxiliary pilot may be estimated and canceled in addition to the common pilot.

Similarly, W-CDMA supports a number of different pilot channels. First, a common pilot channel (CPICH) may be transmitted on a primary base station antenna. Second, a diversity CPICH may be generated based on non-zero pilot data and transmitted on a diversity antenna of the base station. Third, one or more secondary CPICHs may be transmitted in a restricted part of the cell, and each secondary CPICH is generated using a non-zero channelization code. Fourth, the base station may further transmit a dedicated pilot to a specific user using the same channelization code as the user's data channel. In this case, the pilot symbols are time-multiplexed with the data symbols to that user. Accordingly, it will be understood by those skilled in the art that the techniques described herein are applicable for processing all of the above different types of pilot channels, and other pilot channels that may also be transmitted in a wireless communication system.

The demodulator and other processing units that may be used to implement various aspects and embodiments of the invention may be implemented in hardware, software, firmware, or a combination thereof. For a hardware design, the demodulator (including the data demodulation unit and the elements used for pilot interference estimation and cancellation such as the pilot estimator and the pilot interference estimator), and other processing units may be implemented within one or more application specific integrated circuits (ASICs), digital signal processors (DSPs), digital signal processing devices (DSPDs), field programmable gate arrays (FPGAs), processors, microprocessors, controllers, microcontrollers, programmable logic devices (PLDs), other electronic units, or any combination thereof.

For a software implementation, the elements used for pilot interference estimation and cancellation and data demodulation may be implemented with modules (e.g., procedures, functions, and so on) that perform the functions described herein. The software codes may be stored in a memory unit (e.g., memory 262 in FIG. 2) and executed by a processor (e.g., controller 260). The memory unit may be implemented within the processor or external to the processor, in which case it can be communicatively coupled with the processor via various means as it is known in the art.

The elements used to implement the pilot interference estimation and cancellation described herein may be incorporated in a receiver unit or a demodulator that may further be incorporated in a terminal (e.g., a handset, a handheld unit, a stand-alone unit, and so on), a base station, or some other communication devices or units. The receiver unit or demodulator may be implemented with one or more integrated circuits.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for canceling pilot interference at a receiver unit in a wireless communication system, comprising:
receiving a signal comprised of a plurality of signal instances, wherein each signal instance includes a pilot and data;
estimating pilot interference due to each of the plurality of signal instances;
accumulating estimated pilot interference due to the plurality of signal instances in a buffer to provide a total pilot interference;
subtracting the total pilot interference from the received signal to derive a pilot-canceled signal; and
processing the pilot-canceled signal to derive data for each signal instance in the received signal,
wherein the pilot interference due to each of the one or more signal instances is estimated by
processing the signal instance to derive an estimate of a channel response of the signal instance; and
multiplying pilot data for the signal instance with the estimated channel response to provide the estimated pilot interference.

2. The method of claim 1, wherein the pilot data for each of the one or more signal instances is a spreading sequence for the signal instance.

3. The method of claim 2, wherein the spreading sequence for the signal instance has a phase corresponding to an arrival time of the signal instance.

4. The method of claim 1, wherein the estimated channel response for each of the one or more signal instances is derived by
despreading data samples for the received signal with a spreading sequence for the signal instance,
channelizing the despread samples with a pilot channelization code to provide pilot symbols, and
filtering the pilot symbols to provide the estimated channel response.

5. The method of claim 1, wherein the estimated channel response of the signal instance is derived based on a current segment of data samples for the received signal and the estimated pilot interference is for a subsequent segment of data samples.

6. The method of claim 1, wherein the estimated channel response of the signal instance is derived based on a current segment of data samples for the received signal and the estimated pilot interference is for the same segment of data samples.

7. The method of claim 1, wherein the estimated channel response for each of the one or more signal instances is derived based on data samples for the received signal.

8. The method of claim 1, wherein the estimated channel response for each of the one or more signal instances is derived based on data samples having pilot from the signal instance unremoved but pilots from other interfering signal instances removed.

9. A method for canceling pilot interference at a receiver unit in a wireless communication system, the method comprising:
receiving a signal comprised of a plurality of signal instances, each signal instance comprising a pilot and data;
deriving total pilot interference due to one or more signal instances;
subtracting the total pilot interference from the received signal to derive a pilot-canceled signal; and
processing the pilot-canceled signal to derive demodulated data for each of at least one signal instance in the received signal,
wherein the processing of the pilot-canceled signal for each of the at least one signal instance includes:
despreading samples for the pilot-canceled signal with a spreading sequence for the signal instance;
channelizing the despread samples with a data channelization code to provide data symbols; and
demodulating the data symbols with pilot estimates to provide the demodulated data for the signal instance.

10. The method of claim 9, wherein the pilot estimates for each of the at least one signal instance are derived based on data samples for the received signal.

11. The method of claim 9, wherein the pilot estimates for each of the at least one signal instance are derived based on data samples having pilot from the signal instance unremoved but pilots from other interfering signal instances removed.

12. A method for canceling pilot interference at a receiver unit in a wireless communication system, the method comprising:
receiving a signal comprised of a plurality of signal instances, each signal instance comprising a pilot and data;
deriving total pilot interference due to one or more signal instances;
subtracting the total pilot interference from the received signal to derive a pilot-canceled signal; and
processing the pilot-canceled signal to derive data for each of at least one signal instance in the received signal, wherein the pilot interference due to the one or more signal instances is estimated in a time-division multiplexed manner.

13. A method for canceling pilot interference at a receiver unit in a wireless communication system, comprising:
receiving a signal comprised of a plurality of signal instances, wherein each signal instance includes a pilot and data;
estimating pilot interference due to each of the plurality of signal instances;
accumulating estimated pilot interference due to the plurality of signal instances in a buffer to provide a total pilot interference;
subtracting the total pilot interference from the received signal to derive a pilot-canceled signal; and
processing the pilot-canceled signal to derive data for each signal instance in the received signal,
wherein the subtracting includes subtracting samples for the total pilot interference from data samples for the received signal, and
wherein the samples for the total pilot interference and data samples are both provided at a particular sample rate.

14. A method for canceling pilot interference at a receiver unit in a wireless communication system, comprising:
receiving a signal comprised of a plurality of signal instances, wherein each signal instance includes a pilot and data;
estimating pilot interference due to each of the plurality of signal instances;

accumulating estimated pilot interference due to the plurality of signal instances in a buffer to provide a total pilot interference;
subtracting the total pilot interference from the received signal to derive a pilot-canceled signal; and
processing the pilot-canceled signal to derive data for each signal instance in the received signal,
wherein the pilot interference due to a signal instance being processed to derive the data is excluded from the total pilot interference.

15. A method for canceling pilot interference at a receiver unit in a wireless communication system, the method comprising:
receiving a signal comprised of a plurality of signal instances, each signal instance comprising a pilot and data;
deriving total pilot interference due to one or more signal instances;
subtracting the total pilot interference from the received signal to derive a pilot-canceled signal;
processing the pilot-canceled signal to derive data for each of at least one signal instance in the received signal; and
processing the pilot-canceled signal to search for new signal instances in the received signal.

16. The method of claim 13, wherein the sample rate is multiple times a chip rate.

17. The method of claim 1, wherein the deriving the total pilot interference is performed based on segments of data samples for the received signal.

18. The method of claim 17, wherein the each segment includes data samples for one symbol period.

19. The method of claim 1, wherein the processing to derive data is performed based on segments of pilot-canceled data samples for the pilot-canceled signal.

20. A method for canceling pilot interference at a receiver unit in a wireless communication system, comprising:
receiving a signal comprised of a plurality of signal instances, wherein each signal instance includes a pilot and data;
estimating pilot interference due to each of the plurality of signal instances;
accumulating estimated pilot interference due to the plurality of signal instances in a buffer to provide a total pilot interference;
subtracting the total pilot interference from the received signal to derive a pilot-canceled signal; and
processing the pilot-canceled signal to derive data for each signal instance in the received signal,
wherein the deriving the total pilot interference and the processing of the pilot-canceled signal are performed in parallel.

21. The method of claim 1, wherein the deriving the total pilot interference and the processing of the pilot-canceled signal are performed in a pipelined manner.

22. The method of claim 1, wherein the wireless communication system is a CDMA system.

23. The method of claim 22, wherein the CDMA system supports cdma2000 standard.

24. The method of claim 22, wherein the CDMA system supports W-CDMA standard.

25. The method of claim 22, wherein the CDMA system supports IS-95 standard.

26. The method of claim 22, wherein the received signal comprises one or more reverse link modulated signals in the CDMA system.

27. The method of claim 22, wherein the received signal comprises one or more forward link modulated signals in the CDMA system.

28. A method for canceling pilot interference at a receiver unit in a wireless communication system, comprising:
processing a received signal comprised of a plurality of signal instances to provide data samples, wherein each signs) instance includes a pilot;
processing the data samples to derive an estimate of pilot interference due to each of one or more signal instances;
deriving total pilot interference due to the one or more signal instances based on the estimated pilot interference;
subtracting the total pilot interference from the data samples to derive pilot-canceled data samples; and
processing the pilot-canceled data samples to derive data for each of at least one signal instance in the received signal, wherein the processing the data samples to derive the estimated pilot interference due to each of the one or more signal instances includes
despreading the data samples with a spreading sequence for the signal instance,
channelizing the despread samples with a pilot channelization code to provide pilot symbols,
filtering the pilot symbols to provide an estimate or a channel response of the signal instance, and
multiplying the spreading sequence for the signal instance with the estimated channel response to provide the estimated pilot interference due to the signal instance.

29. A method for canceling pilot interference at a receiver unit in a wireless communication system, comprising:
processing a received signal comprised of a plurality of signal instances to provide data samples, wherein each signal instance includes a pilot;
processing the data samples to derive an estimate of pilot interference due to each of one or more signal instances;
deriving total pilot interference due to the one or more signal instances based on the estimated pilot interference;
subtracting the total pilot interference from the data samples to derive pilot-canceled data samples; and
processing the pilot-canceled data samples to derive demodulated data for each of at least one signal instance in the received signal, wherein the processing the pilot-canceled data samples to derive the demodulated data for each of the at least one signal instance includes
despreading the pilot-canceled data samples with a spreading sequence for the signal instance,
channelizing the despread samples with a data channelization code to provide data symbols, and
demodulating the data symbols to provide the demodulated data for the signal instance.

30. The method of claim 29, wherein the subtracting includes
subtracting interference samples for the total pilot interference from the data samples for the received signal, wherein the interference samples and data samples are both provided at a particular sample rare that is multiple times a chip rate.

31. A receiver unit in a wireless communication system, the receiver unit comprising:
   a receiver configured to process a received signal comprised of a plurality of signal instances to provide data samples, wherein each signal instance includes a pilot and data; and
   a demodulator including:
   a pilot interference estimator configured to process the data samples to derive an estimate of pilot interference due to each of the plurality of signal instances;
   a buffer configured to accumulate estimated pilot interference due to the plurality of signal instances to provide a total pilot interference;
   a summer configured to subtract the total pilot interference from the data samples to derive pilot-canceled data samples;
   a data demodulation unit configured to process the pilot-canceled data samples to derive data for each signal instance in the received signal; and
   a channel estimator configured to provide an estimated channel response for each of the one or more signal instances.

32. The receiver unit of claim 31, wherein the pilot interference estimator is further configured to multiply pilot data for each of the one or more signal instances with the estimated channel response for the signal instance to provide the estimated pilot interference due to the signal instance.

33. A receiver unit in a wireless communication system, the receiver unit comprising:
   a receiver configured to process a received signal comprised of a plurality of signal instances to provide data samples, wherein each signal instance includes a pilot and data; and
   a demodulator including:
   a pilot interference estimator configured to process the data samples to derive an estimate of pilot interference due to each of one or more signal instances and to derive total pilot interference due to the one or more signal instances based on the estimated pilot interference,
   a summer configured to subtract the total pilot interference from the data samples to derive pilot-canceled data samples, and
   a data demodulation unit configured to process the pilot-canceled data samples to derive demodulated data for each of at least one signal instance in the received signal, wherein for each of the at least one signal instance the data demodulation unit is configured to despread the pilot-canceled data samples with a spreading sequence for the signal instance, channelize the despread samples with a data channelization code to provide data symbols, and demodulate the data symbols with pilot estimates for the signal instance to provide the demodulated data for the signal instance.

34. A terminal in a CDMA system, the terminal comprising:
   a receiver configured to process a received signal comprised of a plurality of signal instances to provide data samples, wherein each signal instance includes a pilot and data; and
   a demodulator including
   a pilot interference estimator configured to process the data samples to derive an estimate of pilot interference due to each of the plurality of signal instances;
   a buffer configured to accumulate estimated pilot interference due to the plurality of signal instances to provide a total pilot interference;
   a summer configured to subtract the total pilot interference from the data samples to derive pilot-canceled data samples;
   a data demodulation unit configured to process the pilot-canceled data samples to derive data for each signal instance in the received signal; and
   a channel estimator configured to provide an estimated channel response for each of the one or more signal instances.

35. The terminal of claim 34, wherein the pilot interference estimator is further configured to multiply pilot data for each of the one or more sign) instances with the estimated channel response for the signal instance to provide the estimated pilot interference due to the signal instance.

36. A terminal in a CDMA system, the terminal comprising
   a receiver configured to process a received signal comprised of a plurality of signal instances to provide data samples, wherein each signal instance includes a pilot and data; and
   a demodulator including
   a pilot interference estimator configured to process the data samples to derive an estimate of pilot interference due to each of one or more signal instances and to derive total pilot interference due to the one or more signal instances based on the estimated pilot interference;
   a summer configured to subtract the total pilot interference from the data samples to derive pilot-canceled data samples; and
   a data demodulation unit configured to process the pilot-canceled data samples to derive demodulated data for each of at least one signal instance in the received signal, wherein for each of the at least one signal instance the data demodulation unit is configured to despread the pilot-canceled data samples with a spreading sequence for the signal instance, channelize the despread samples with a data channelization code to provide data symbols, and demodulate the data symbols with pilot estimates for the signal instance to provide the demodulated data for the signal instance.

37. A base station in a CDMA system, the base station comprising:
   a receiver configured to process a received signal comprised of a plurality of signal instances to provide data samples, wherein each signal instance includes a pilot and data; and
   a demodulator including
   a pilot interference estimator configured to process the data samples to derive an estimate of pilot interference due to each of the plurality of signal instances;
   a buffer configured to accumulate estimated pilot interference due to the plurality of signal instances to provide a total pilot interference;
   a summer configured to subtract the total pilot interference from the data samples to derive pilot-canceled data samples;
   a data demodulation unit configured to process the pilot-canceled data samples to derive data for each signal instance in the received signal; and
   a channel estimator configured to provide an estimated channel response for each of the one or more signal instances.

38. The base station of claim 37, wherein the pilot interference estimator is further configured to multiply pilot data for each of the one or more signal instances with the estimated channel response for the signal instance to provide the estimated pilot interference due to the signal instance.

39. A base station in a COMA system, the base station comprising:
- a receiver configured to process a received signal comprised of a plurality of signal instances to provide data samples, wherein each signal instance includes a pilot and data; and
- a demodulator including
- a pilot interference estimator configured to process the data samples to derive an estimate of pilot interference due to each of one or more signal instances and to derive total pilot interference due to the one or more signal instances based on the estimated pilot interference;
- a summer configured to subtract the total pilot interference from the data samples to derive pilot-canceled data samples; and
- a data demodulation unit configured to process the pilot-canceled data samples to derive demodulated data for each of at least one signal instance in the received signal, wherein for each of the at least one signal instance the data demodulation unit is configured to despread the pilot-canceled data samples with a spreading sequence for the signal instance, channelize the despread samples with a data channelization code to provide data symbols, and demodulate the data symbols with pilot estimates for the signal instance to provide the demodulated data for the signal instance.

40. The receiver unit of claim 31, further comprising an interference accumulator unit configured to accumulate the total pilot interference for the one or more signal instances.

41. The interference accumulator unit of claim 40, further comprising:
- a plurality of sections defined by a time offset.

* * * * *